UNITED STATES PATENT OFFICE.

CHARLES F. AMPT, OF WYOMING, OHIO.

FOOD.

1,261,996.  Specification of Letters Patent.  Patented Apr. 9, 1918.

No Drawing.  Application filed November 3, 1917. Serial No. 200,098.

*To all whom it may concern:*

Be it known that I, CHARLES F. AMPT, a citizen of the United States, residing at Wyoming, in the county of Hamilton and State of Ohio, have invented certain new and useful Improvements in Foods, of which the following is a specification.

My invention relates to food-stuffs, and its object is to provide a food which, while being palatable and nutritious and adapted to keep preserved for a long period of time, will have bowel-lubricating properties.

Another object of my invention is to impart to the food these properties by means of the "shortening" ingredient of the food.

My invention consists in the improved food or composition of food-stuffs, as set forth herein.

Broadly stated, my invention comprehends the association in a food preparation of a nutritive element, together with an element to impart it to the bowel-lubricating properties above referred to; this latter element also preferably being the "shortening" ingredient of the food. As is well known, the most effective "shortening" ingredients are fatty or oily substances of animal or vegetable origin, as for instance, lard or cotton-seed oil. These fatty ingredients, however, as they are well known, are digested and assimilated and are really nutritive elements along with the elements for which they are perform the "shortening" function. That is to say, such usual "shortening" ingredients lack the properties which I have above alluded to of lubricating the bowels and thus promoting said excretory action without being assimilated.

There are substances having these bowel-lubricating properties, as for instance, the refined white medicinal oils now extensively used for this purpose. These oils are of petroleum and hence of mineral origin. They are colorless, tasteless and odorless, and are neutral and inert when present in the alimentary tract; they are not digested nor assimilated, but act merely as a lubricant, and hence as a laxative, without any of the objectionable consequences associated with most other laxatives. These properties of these oils are well-known, and these oils have been extensively used as medicines taken in definite doses and not in association with any other substance. When thus taken, the expected benefits are derived, but frequently not without the accompaniment of some objectionable consequences as the running of the oil due to its extreme thinness and its ability to pass entirely through the alimentary tract without combining with any other substances or being digested or assimilated in the least degree.

My invention comprehends the combination of such an oil, preferably the petroleum oil just referred to, or any other petroleum oil or other mineral oil, or any other oil or oleaginous substance having the property of promoting excretory action without becoming digested or assimilated, together with some food stuff highly desirable for its nutritiveness or its flavor or consistency, or all of these, in such a manner that the resultant composition will combine within itself all of the properties of both kinds of ingredients, *i. e.*, so that the resultant foodstuffs will be nutritious, palatable, of an attractive consistency, and at the same time, favorable to the promotion of the excretory action of the bowels without contributing an undue proportion of fatty elements to the body.

In the present application, I prefer to set forth as a specific example of my invention, a bread or pastry in which the flour, meal or other farinaceous and principal ingredient together with the seasoning, leavening and other ingredients, except the "shortening" ingredient, are the same as they may be in any other bread, pastry, or the like, according to the established practice, preference or necessity of the maker, but in which the "shortening" ingredient consists either partially or wholly of a substance such as has just been described, in that such substance has the property of promoting excretory action without being digested or assimilated, and therefore unduly augmenting the fatty constituency of the body.

For instance, this "shortening" ingredient may consist solely of a suitable amount of the refined and bleached petroleum oil heretofore used for medicinal purposes, in view of the properties just alluded to; or some other oleaginous mineral substance, as for instance, petrolatum or any other substance whether oleaginous, or whether of mineral origin or not, so long as it has the properties of "shortening" the food preparation, and at the same time, producing the advantageous physiological effects without the disadvantages, as just set forth; or with other "shortening."

Examples of such food preparations in which such "shortening" ingredient is used are bread of any of the usual cereals, as wheat, corn, rye or oats; pies, biscuits, pan cakes, and in fact any of the usual food preparations in which a cereal or farinaceous ingredient is the principal one, and which requires some "shortening" ingredient to so reduce the agglutination of the farinaceous particles and in which preparations heretofore such "shortening" ingredient, always a fatty substance, has been digested and assimilated. Where the person requires a constant considerable increment of fatty elements, this digestion and assimilation of the "shortening" ingredient of the food is an advantage; or when the person's system does not readily assimilate the fatty substances, it may be no distinct disadvantage. But with a subject having a strong tendency to obesity, either due to a decided appetite for fatty foods or to having a system that assimilates such food elements readily, it is a great advantage to be able to supply a person with foods having all of the attractiveness to persons of such appetite that are possessed by foods well shortened by means of digestible fatty "shortening" ingredients. Such person's appetite is thus readily satisfied, and consequently the digestion of the desirable food elements greatly promoted. At the same time, when this "shortening" ingredient thus inert in the alimentary tract, except for its lubricating properties, promotes the excretory action of the bowels, the health of the person is thus further greatly contributed to.

Moreover, by providing this bowel-lubricating substance as an ingredient of and combined with other ingredients of the food and not in a free liquid state at the inception, the introduction of the lubricating substance into the bowels is far more gradual, not only on account of the relatively slow introduction of the food-stuff in which it is contained during the progress of a meal extending over a period of from fifteen to sixty minutes instead of taken as a single dose, as when the substance is utilized as heretofore; but due also to the gradual liberation of the substance from the food ingredients after entering the stomach, and during the process of digestion thereof. From this it will be seen that the lubricating substance is supplied to the bowels in very minute quantities practically throughout the period between meals while the digestion of the food elements is progressing. Thus, the lubricant is supplied just as it is needed, and the tendency to run freely through the system and produce annoyance is greatly overcome.

These advantages are also realized in the use of fried foods in which the fatty medium consists of a substance having the properties just described. For instance, in the preparation of such foods as fried meats, fish, sea foods, eggs or vegetables and such fried farinaceous products as pan cakes, doughnuts and the like, I partially or entirely substitute for lard or other fatty ingredient adapted to be digested and assimilated, the petroleum oil or other oleaginous ingredient adapted to be taken into the body without digestion or assimilation, and adapted to have all of the advantageous effects just described. It will be understood that in this use, the oleaginous substance enters and becomes an ingredient of the food due to the food having been wholly or partially immersed in the heated substance, such as lard, cotton-seed oil, olive oil and the like, in such foods as heretofore prepared, and such as the petroleum oil or equivalent substance according to my invention. The oleaginous substance thus permeates the food-stuff, and while acting as a medium to prevent burning or scorching of the food-stuff or sticking thereof to the vessel in which it is cooked, such proportion of the oleaginous substance as is incorporated in the food-stuff during such cooking, thereby becomes an ingredient of the food-stuff with the disadvantages or advantages hereinbefore described, depending upon whether the food-stuff is as heretofore prepared or according to my invention.

From the foregoing, it will be understood that my invention is capable of a variety of applications, some of which have been instanced, and others of which will readily be recognized by cooks, bakers or others skilled in culinary operations. Therefore, while I have specifically mentioned certain foods as examples of embodiments of my invention and have specifically mentioned certain substances making up the novel ingredient, and have especially described as most suitable, the medicinal petroleum oil, well-known as having the properties desired, I do not wish to be understood as being limited to these examples, but having fully set forth the method of preparation and use of certain foods according to my invention and the advantages attendant thereon in such a manner that those skilled in the art may practice the invention, what I claim as new and desire to secure by Letters Patent is:

1. A food adapted for ultimate use after cooking, and having a "shortening" ingredient of mineral origin adapted to be retained in said food when said food is in its ultimate condition for use.

2. A food adapted for ultimate use after cooking, and having a "shortening" ingredient of petroleum origin adapted to be retained in said food when said food is in its ultimate condition for use.

3. A food adapted for ultimate use after cooking, and having a tasteless, odorless "shortening" ingredient adapted to be retained in said food when said food is in its ultimate condition for use.

4. A food adapted for ultimate use after cooking, and having a "shortening" ingredient that is not digested nor assimilated, and which is adapted to be retained in said food when said food is in its ultimate condition for use.

5. A food adapted for ultimate use after cooking, and having a tasteless, odorless "shortening" ingredient that is not digested nor assimilated, and which is adapted to be retained in said food when said food is in is ultimate condition for use.

6. A food adapted for ultimate use after cooking, and having a "shortening" and bowel-lubricating ingredient that is not digested nor assimilated, and which is adapted to be retained in said food when said food is in its ultimate condition for use.

7. A food adapted for ultimate use after cooking, and having a "shortening" ingredient which is neutral and inert when present in the alimentary tract, is not digested nor assimilated, and which promotes the excretory action of the bowels, and which is adapted to be retained in said food when said food is in its ultimate condition for use.

8. A food comprising a nutritive ingredient normally adapted to agglutinate on cooking, and a permanent oleaginous ingredient adapted to counteract the agglutination during cooking, and which is neutral and inert when present in the alimentary tract, and is not digested nor assimilated.

9. A food comprising a nutritive ingredient normally adapted to agglutinate on cooking, and a permanent oleaginous ingredient adapted to counteract the agglutination during cooking, and which is neutral and inert when present in the alimentary tract, is not digested nor assimilated, and is adapted to promote the excretory action of the bowels.

10. A food comprising a nutritive ingredient normally adapted to agglutinate on cooking, and a permanent bowel-lubricating oleaginous ingredient adapted to counteract the agglutination during cooking, and which is neutral and inert when present in the alimentary tract, and is not digested nor assimilated.

11. A food comprising a nutritive ingredient normally adapted to agglutinate on cooking, and a permanent oleaginous ingredient of mineral origin adapted to counteract the agglutination during cooking, and which is neutral and inert when present in the alimentary tract, and is not digested nor assimilated.

12. A food comprising a nutritive ingredient normally adapted to agglutinate on cooking, and a permanent oleaginous ingredient of mineral origin adapted to counteract the agglutination during cooking, and which is neutral and inert when present in the alimentary tract, is not digested nor assimilated, and is adapted to promote the excretory action of the bowels.

13. A food comprising a nutritive ingredient normally adapted to agglutinate on cooking, and a permanent oleaginous ingredient of petroleum origin, adapted to counteract the agglutination during cooking, and which is neutral and inert when present in the alimentary tract, is not digested nor assimilated, and is adapted to promote the excretory action of the bowels.

14. A food comprising a nutritive ingredient normally adapted to agglutinate on cooking, and a permanent bowel-lubricating oleaginous ingredient of petroleum origin, adapted to counteract the agglutination during cooking, and which is neutral and inert when present in the alimentary tract and is not digested nor assimilated.

CHARLES F. AMPT.

Witnesses:
JAMES N. RAMSEY,
CLARENCE PERDEW.